United States Patent
Gulhar et al.

(10) Patent No.: US 10,322,508 B2
(45) Date of Patent: Jun. 18, 2019

(54) ROBOTIC DEVICES AND METHODS OF OPERATING ROBOTIC DEVICES

(71) Applicants: Abhinav Gulhar, Erlangen (DE); Philip Mewes, Nürnberg (DE); Holger Mönnich, Friedberg (DE); Sabine Thürauf, Forchheim (DE)

(72) Inventors: Abhinav Gulhar, Erlangen (DE); Philip Mewes, Nürnberg (DE); Holger Mönnich, Friedberg (DE); Sabine Thürauf, Forchheim (DE)

(73) Assignees: KUKA Roboter GmbH, Augsburg (DE); Siemens Aktiengesellschaft, München (DE)

( * ) Notice: Subject to any disclaimer, the term of this patent is extended or adjusted under 35 U.S.C. 154(b) by 360 days.

(21) Appl. No.: 14/951,866

(22) Filed: Nov. 25, 2015

(65) Prior Publication Data

US 2016/0144509 A1 May 26, 2016

(30) Foreign Application Priority Data

Nov. 26, 2014 (DE) ........................ 10 2014 224 123

(51) Int. Cl.
*B25J 9/16* (2006.01)

(52) U.S. Cl.
CPC ... *B25J 9/1653* (2013.01); *G05B 2219/39305* (2013.01); *G05B 2219/40201* (2013.01);
(Continued)

(58) Field of Classification Search
CPC .................................................... A61B 34/30
See application file for complete search history.

(56) References Cited

U.S. PATENT DOCUMENTS

| 6,424,885 B1* | 7/2002 | Niemeyer | A61B 34/70 700/259 |
| 8,287,522 B2* | 10/2012 | Moses | A61B 17/1764 128/898 |

(Continued)

FOREIGN PATENT DOCUMENTS

| DE | 102005054575 B3 | 4/2007 |
| DE | 102012015975 A1 | 3/2013 |

OTHER PUBLICATIONS

Fei, Baowei, et al. "The safety issues of medical robotics." Reliability Engineering & System Safety 73.2 (2001): 183-192.

(Continued)

*Primary Examiner* — Timothy R Waggoner
(74) *Attorney, Agent, or Firm* — Lempia Summerfield Katz LLC

(57) ABSTRACT

A method is provided for operating a robotic device having a kinematic chain of movable components. The method includes: detecting respective values at least one characteristic of a plurality of the movable components by sensors arranged on the kinematic chain or in the vicinity of the kinematic chain; ascertaining a maximum value based on the detected values; comparing the ascertained maximum value with a predefined first safety limit by a controller of the robotic device; and adjusting the at least one characteristic or a further characteristic of the kinematic chain when the ascertained maximum value has a predefined relationship with the first safety limit, in order to increase the operating safety of the robotic device.

23 Claims, 2 Drawing Sheets

(52) U.S. Cl.
CPC ... *G05B 2219/45117* (2013.01); *Y10S 901/04* (2013.01); *Y10S 901/09* (2013.01)

(56) References Cited

U.S. PATENT DOCUMENTS

| | | | |
|---|---|---|---|
| 8,768,516 B2* | 7/2014 | Diolaiti | B25J 9/1689 |
| | | | 700/262 |
| 2007/0013336 A1* | 1/2007 | Nowlin | B25J 9/1682 |
| | | | 318/568.21 |
| 2007/0120512 A1 | 5/2007 | Albu-Schaffer et al. | |
| 2015/0272575 A1* | 10/2015 | Leimbach | A61B 17/072 |
| | | | 227/175.3 |

OTHER PUBLICATIONS

German Office Action for German Application No. 102014224123.5, dated Aug. 4, 2015, with English Translation.
Davies BL. "A Discussion of Safety Issues for Medical Robots." Computer-integrated surgery: technology and clinical applications, Cambridge, MA: MIT Press, 1995, pp. 287-296.

* cited by examiner

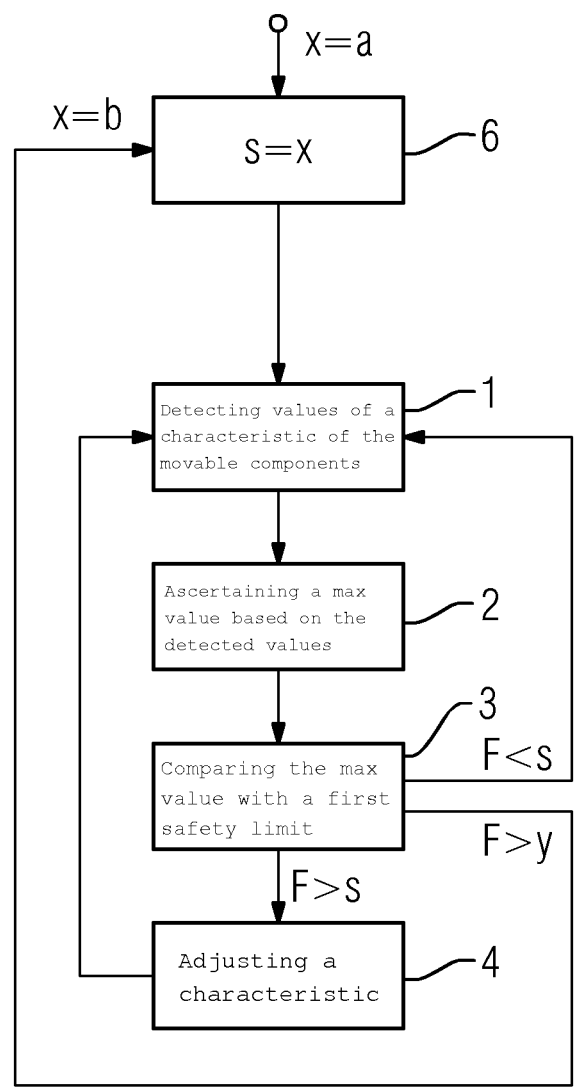

ROBOTIC DEVICES AND METHODS OF OPERATING ROBOTIC DEVICES

ROBOTIC DEVICES AND METHODS OF OPERATING ROBOTIC DEVICES

This application claims the benefit of DE 10 2014 224 123.5, filed on Nov. 26, 2014, which is hereby incorporated by reference in its entirety.

TECHNICAL FIELD

The embodiments relate to methods for operating a robotic device having a kinematic chain of movable components and having a plurality of sensors arranged on the kinematic chain. The embodiments also relate to robotic devices of this kind.

BACKGROUND

Robotic devices, which cooperate semi-automatically or automatically with people, are increasingly establishing themselves in the world of work. One prime example of this is the medical sector in which medical-robotic devices are being used more and more, particularly in the case of increasingly common minimally invasive interventions. Because the robotic devices are establishing themselves in new areas of operation, new safety concepts are also being demanded since the conventional safety concepts tailored to industrial robots are not adequate or are not applicable in new areas of operation. Some new safety concepts have already established themselves here, for example a redundant design of sensors.

SUMMARY AND DESCRIPTION

The scope of the present invention is defined solely by the appended claims and is not affected to any degree by the statements within this summary. The present embodiments may obviate one or more of the drawbacks or limitations in the related art.

It is the object of the present embodiments to increase the operating safety of a robotic device, and thereby also the safety of people in the vicinity of the robotic device.

One method for operating a robotic device having a kinematic chain of movable components or a plurality of kinematic chains of movable components includes a plurality of acts. One act is detecting respective values of at least one characteristic of a plurality of the movable components by sensors of the robotic device arranged on or in the vicinity of the kinematic chain. A further act is ascertaining a maximum value on the basis of the detected values. Further values may also be taken into account here. The maximum value may be ascertained here for example directly by respective absolute values or by respective relative values, which relate one absolute value to one respective maximum absolute value of the at least one characteristic. An additional act is a comparison of the ascertained maximum value with a predefined first safety limit by a control unit of the robotic device. An additional act is adjusting the at least one characteristic or a further characteristic if the ascertained maximum value has a predefined relationship with the first safety limit.

A characteristic may be adjusted if the ascertained maximum value is less than the first safety limit. For example, a characteristic, (e.g., rigidity), may be adjusted such that a movement of the robotic device is prevented if the ascertained maximum value of the characteristic falls below the first safety limit. For example, the robotic device may be blocked if a force as the characteristic falls below the predefined first safety limit.

The method has the advantage that both a voluntary movement and an involuntary movement of the robotic device, or a movable component of the robotic device, which exceeds the predefined first safety limit in one characteristic, is adjusted. Movements of the robotic device or of one or more of the movable components of the robotic device, which are potentially dangerous for a person in the vicinity of the robotic device, may therefore be prevented. It is the ascertaining of the maximum value and the use thereof during comparison that provides here for a reduced risk of injury or damage in the vicinity. The operating safety of the robotic device is increased accordingly.

In particular, the first safety limit may be specified here relative to an absolute predefined limit. This also applies to the further safety limits that are described herein. This has the advantage that the corresponding safety limit may be adjusted more easily to a new situation or to a new object or to a new field of application of the robotic device.

In an exemplary embodiment, it is provided that the characteristic includes a parameter of the kinematic chain as a spring-damper system, in particular a rigidity and/or damping of the movable components, and/or a torque acting on the movable components and/or a force acting on the movable components and/or a speed of the movable components and/or an acceleration of the movable components. The rigidity and/or damping may include a rigidity and/or damping of the entire kinematic chain here. Various models may be used for the description of the kinematic chain as a spring-damper system. This has the advantage that the decisive characteristics of a movement of the movable components, which are decisive for a degree of risk, are detected and adjusted in this way. An efficient increase in the safety of the robotic device is achieved in this way.

In a further embodiment, it may be provided that the characteristic includes a change over time in rigidity and/or torque and/or a force and/or speed and/or acceleration. This has the advantage that more accurate detection of an actual movement of the robotic device is possible by way of the characteristics. The characteristic may also be adjusted more accurately and the safety limit may be better adjusted to the actual circumstances.

In a further embodiment, it is provided that when ascertaining the maximum value, a geometry of the movable components in the kinematic chain, and in particular a geometry of a function-specific end member arranged at one end of the kinematic chain, or end effector of the kinematic chain, is taken into account. The function-specific end member may include, for example, an exchangeable tool at the end of the kinematic chain, which has a predefined, specific function. In particular, a length of one or more of the movable components may be taken into account. Therefore, for example, a lever effect resulting from the geometry, which affects forces and speeds at different locations of the robotic device, may be taken into account. This has the advantage that the ascertained maximum value maps a real danger or a real damage potential in the vicinity of the robotic device better. A safety reserve may therefore be better adjusted to real requirements by the first safety limit. The safety of the robotic device is increased further thereby.

In an exemplary embodiment, it is provided that adjusting occurs if the ascertained maximum value is greater than the first safety limit. The function "greater than" then corresponds to the predefined relationship with the first safety limit. Here and at other points in the description the values may be compared using amounts that may therefore ignore for example a direction that may find expression for example in a sign of a variable. This is particularly advantageous if the characteristic includes a torque and/or force and/or speed and/or acceleration since here large values of these characteristics may constitute a grave danger. Adjusting a characteristic may accordingly include a reduction in the characteristic here, (e.g., speed and/or acceleration). This has the advantage that permitted maximum values above the first safety limit may be predefined for the characteristic, and this limits danger or injury and the safety of the robotic device is therefore increased.

In a further embodiment, it is provided that the first safety limit is predefined as a function of a position and/or orientation of a movable component in the kinematic chain, in particular, a position and/or orientation of the function-specific end member of the kinematic chain. The position or orientation may, in particular, be determined relative to a further predetermined position and/or orientation. The further predefined position and/or orientation may, for example, represent a further device or a person, (e.g., an operator or a patient). The first safety limit may therefore be predefined as a function of a distance of the movable component, in particular, of the function-specific end member, from the further predetermined position or an orientation in relation thereto. The characteristic may be adjusted when a specific position is approached and/or in the case of an orientation in relation to the specific position by way of the predefining of the first safety limit that is dependent on the position and therefore the distance and/or orientation. This has the advantage that the safety limit, and therewith the safety reserves, is/are particularly flexibly adjusted to a situation. A high level of safety of the robotic device is therefore combined with practical handling, which may be adjusted to individually present conditions of a physical nature.

It may, in particular, be provided that checking is carried out in which a check is made as to in which of a plurality of predetermined areas the position of the movable component is located, as well as a consideration of a result of the checking when predefining the first safety limit as a function of the position. In particular, an orientation of the movable component at the position may also be taken into account. The predetermined areas may be areas taken up by other devices or surround these devices. The areas may also be areas inside a patient, which are taken up by respective anatomical structures, for example by bones and/or organs. The areas may likewise be respective surrounding areas of anatomical structures inside a patient. During checking, it may also just be checked whether the position of the movable component is located within a predetermined area or not.

In a further embodiment, it is provided that the first safety limit (S) is predefined as a function of a joint angle of a joint and/or a combination of joint angles of a plurality of joints between movable components in the kinematic chain. In the process, it may be checked whether the joint angle or angles is/are in one or more predefined area(s). This has the advantage that a movement of the robotic device, or of the kinematic chain, in angular ranges in which the movement capacities of the robotic device and therewith for example alternatives are reduced may be avoided. For example, a movement of a joint in an associated limit area, in which a specific movement of the joint is no longer possible, may therefore be prevented and compensated for example by a combination of movements of other joints. In other words, an equivalent movement of the robotic device may be achieved.

For example, bypassing of an anatomical structure, (e.g., a sensitive organ or a bone), of a patient by a moveable component of the robotic device, in particular, by the function-specific end member or by a tool attached to the end member may be supported by way of a suitable definition of the corresponding areas and predefining a respectively applicable first safety limit. This has the advantage that unintentional introduction of the robotic device or of a movable component into an area not intended for the moveable component is made difficult. Furthermore, an operator may therefore be assisted during operation of the robotic device and, for example, erroneous guiding of the robotic device into a predetermined area may be rendered difficult. Overall the safety of the robotic device is increased in this way.

In a further embodiment, it is provided that the first safety limit is predefined as a function of the function-specific end member of the kinematic chain. Different safety limits may therefore be predefined for different, (e.g., interchangeable), end members. This has the advantage especially in interchangeable end members of a robotic device that corresponding safety reserves are automatically adjusted to the respectively used end member and to its respective risk or damage potential.

In an exemplary embodiment, it is provided that the first safety limit is predefined as a function of a predefined force and/or moment action on the robotic device and/or as a function of a predefined force and/or moment impact by the robotic device. The force and/or moment impact due to the robotic device may be, for example, a force and/or moment impact due to a tool attached to a function-specific end member. The force and/or moment action may be effected here by a person, for example, a patient, or part of a patient, or an operator, and by another device. The predefined force and/or moment impact due to the robotic device may likewise be exerted on a different device or on a person, for example a patient or part of a patient. Here, the predefined force and/or moment action and/or the predefined force and/or moment impact may be a desired or an anticipated force and/or moment action or force and/or moment impact during operation, for example in a specific operating phase.

This has the advantage that the safety reserves are adjusted to different operating phases of the robotic device by predefining the first safety limit. Operation is therefore also prevented from being affected by inappropriate safety reserves, for example, if an occurrence of particularly high forces, speeds or torques is envisaged in an operating phase. A force and/or moment impact of the robotic device intended in an operating phase may also be particularly accurately controlled and adjusted since adjusting the characteristic does not interfere with the force and/or moment impact exerted by the device.

It may be provided that the predefined force and/or moment action is caused by an operator control action on the robotic devices, in particular, by guiding of the robotic device or kinematic chain by an operator's hand, and/or the predefined force and/or moment impact due to the device includes a consequence of an operator control action. The operator control action may in particular be an operator control action here in what is known as a gravity-compensation mode of the robotic device. In this mode, a movement of the robotic device in the direction of the exerted force is induced as a function of a detected force and/or a detected moment. The effect of gravity is not taken into account here.

The robotic device may therefore be guided by an operator in that he exerts a force on the moveable component in a desired direction of movement with his hand. This has the advantage that particularly precise predefining of a force and/or moment action and a force and/or moment impact is possible, so accurate adjustment of a suitable safety reserve is possible by predefining the first safety limit. For example, the effect of counter-movements of external origin, for example reflexes of a patient, on a predefined force and/or moment impact may also be compensated in this way by the robotic device. Falsification of a targeted force and/or moment impact is reduced or eliminated thereby and the safety of the robotic device is again increased.

In an advantageous embodiment, it is provided that a second, (e.g., higher), safety limit is specified and the ascertained maximum value is also compared with the second safety limit. A warning signal is emitted to an operator if the ascertained maximum value is greater than the second safety limit. The warning signal may include a visual and/or an acoustic signal. Adjustment of the characteristic of the robotic device may therefore be graduated. This has the advantage that an operator receives feedback about approaching or overshooting the first safety limit. The operator's attention may therefore be drawn such that the safety of the robotic device is increased. Furthermore, in the case of a second, higher safety limit, particularly dangerous changes in a characteristic of the robotic device, which potentially may not be compensated quickly enough by the robotic device, may therefore be communicated to an operator very quickly.

It may also be provided that the characteristic is adjusted in a plurality of acts and a warning is emitted to the operator in each case, in particular, in one or more of the acts. This has the advantage that an adjustment, which surprises the operator, is avoided. Rash reflexes by the operator, which potentially constitute a risk, are not to be anticipated therewith either.

In a further embodiment, it is provided that a first value and a second value are specified for the first safety limit, and either the first or the second value is chosen as the first safety limit for comparison with the maximum value. More than two values may also be predefined, from which one is chosen for the first safety value. Two different operating modes may therefore be set for the robotic device, which may be switched between by choosing the first or second value for the first safety limit. In particular, what is known as a "locked mode" may also be implemented by way of example by a first value, for example for a speed as the characteristic, being negative, so the safety limit is already exceeded by an idle robotic device. As a consequence, for example, a rigidity may then be adjusted to a predefined high value, so the robotic device is actually blocked in the rest position. A "locked mode" of this kind, in which movement of the robotic device is impossible, may alternatively also be activated directly. This has the advantage that the flexibility of the robotic device is increased. By switching over or switching different modes on and off, the robotic device may quickly adjust to a changed situation, and this is accompanied by an increase in safety.

In a particularly advantageous embodiment, it is provided that the first safety limit is specified as a function of detected values of the at least one characteristic. This may occur as a function of values detected over a predefined period. Therefore, for example, if only very low speeds are detected as the characteristic over the predefined period, the first safety limit may be adjusted to this slow movement since a low speed is obviously desired in the instantaneous operating phase and therefore a lower safety limit may also be expedient. What is known as a breakaway torque may also be implemented therefore. A breakaway torque of this kind causes an idle robotic device to require a minimum force, (e.g., 3 newton (N)), as an operator control action in order to be set in motion. The robotic device may move freely as soon as the minimum force has been applied. If the force of the operator control action falls below a further limiting amount, (e.g., 1 newton), the robotic device is restricted from moving again.

Behavior of this kind may be achieved for example by initially setting the first safety limit at zero or a negative value, so it is exceeded by the detected maximum value even in an idle position of the robotic device. An operator control action having a force of, e.g., 2 newton, does not lead to a movement of the robotic device therefore. If the detected maximum value then assumes a value above the minimum value, for example, more than 3 newton, the first safety limit is raised to an increased value, (e.g., 10 newton), and the robotic device may move freely. If the detected maximum value then drops below a further predefined value, (e.g., to 1 newton), the safety limit is again lowered to the previous, (e.g., negative), value here and the characteristic adjusted accordingly. As before, idle or blocking of the robotic device is the result. This has the advantage that different safety buffers may be achieved as a function of operating phases in which, for example, specific values are conventional for specific characteristics. The flexibility of the robotic device is therefore maximized and the safety improved.

In a further advantageous embodiment, it is provided that the characteristic is adjusted even if the maximum value is below the first safety limit, and, more precisely, if the detected values of the characteristic assume predetermined values for a predefined time interval. In particular, adjusting occurs if the detected values represent idling of the movable components for a predefined time interval. The characteristic may therefore be adjusted in the form of blocking of movements of the robotic device in the case of non-operation over a predefined time interval. This has the advantage that unnoticed, slight movements of the robotic device, what is known as drifting, are prevented in an idle phase of the robotic device in which it does not receive an operator control action.

In a further embodiment, it is provided that adjusting includes limiting a movement about at least one joint or a combined movement about a plurality of joints in the kinematic chain, in particular, blocking a joint in the kinematic chain. A joint or a combination of joints may then be limited in terms of its/their movements. This has the advantage that by limiting the movement the behavior of the robotic device may be predicated for a human operator, so the risk of injury is lowered and safety is increased. The behavior of the robotic device may be limited particularly flexibly precisely by limiting a movement about a combination of joints. A first joint may also be flexibly limited by limiting one or more further joint(s), so the robotic device may be operated while retaining the limitation in a parameter range that is optimum for the robotic device. Movements that are particularly dangerous to an operator or a patient may also easily be ruled out.

A movement about a combination of at least two, (e.g., more than two), joints in the kinematic chain may therefore be limited, so a degree of freedom of the robotic device and/or of the movable components, in particular, of the end member of the kinematic chain, is limited, for example, in a Cartesian reference system. This degree of freedom may be a translational and/or rotatory degree of freedom. This has the advantage that this form of limitation may be particularly easily comprehended by a human operator. Furthermore, many devices are arranged rectangularly in a Cartesian reference system and rectangular areas may be particularly easily protected against the robotic device in this way. This again results in an increase in safety therefore.

In one advantageous embodiment, it is provided that when ascertaining the maximum value, the detected values are related to respective individual limits predefined in terms of soft- and/or hardware. A structural or situation-dependent design of the robotic device may therefore be taken into account. In particular, for example, a conversion of the detected respective values into relative values based on a respective maximum single value allows more accurate ascertainment of a maximum value relevant to actual safety. Therefore, for example one joint may be designed for an angular range between 0 and 180°, and another joint for a range between 0 and 20°, so a detected value of 10° may be less significant for the first joint than for the second joint. This has the advantage that a genuinely relevant extent of a movement detected by characteristic influences the adjustment of the characteristic and therefore the safety reserve.

In a further embodiment, it is provided that the robotic device is a medical-robotic device used in a medical-operative and/or medical-diagnostic procedure. In particular, the medical-robotic device is a medical-operatives device. Since safety plays a particularly important part in devices of this kind, the increase in safety due to the method is particularly advantageous here.

In a further embodiment, it is provided that the predefined force and/or moment action on the robotic device occurs by way of a movement of a subarea of a patient, in particular, an anatomical structure of the patient, and/or the predefined force and/or moment impact occurs by way of the robotic device on a subarea of a patient, in particular, on an anatomical structure of the patient. The respective force and/or moment effect, (e.g., the respective action or impact), is based in particular on a predefined change in force and/or moment. This may be standardized to a predefined amount of a distance covered by a function-specific end member of the kinematic chain. The predefined force and/or moment effect may therefore be defined by a change in force and/or moment per distance. The anatomical structure may include an organ and/or a tumor and/or a bone. A characteristic may therefore be adjusted if a force acts on the robotic device by way of a counter-reaction or reflex of a subarea of the patient. This has the advantage that damage to the subarea may be prevented. A counter-reaction or reflex of the patient, which falsifies a targeted force and/or moment impact due to the robotic device on a subarea of the patient, may also be compensated. This has the advantage that a force exerted by the robotic device on the subarea of the patient may be adjusted more accurately. In both cases, the risk to the patient is reduced and the safety of the robotic device increased in this way.

The embodiments also relate to a robotic device having a kinematic chain of movable components and a plurality of sensors arranged on the kinematic chain. The sensors are designed to detect respective values of at least one characteristic of a plurality of the movable components. The robotic device is in particular an automated, (e.g., a partially or completely automated), robotic device. A tool, which is attached to the function-specific end effector, may be considered here, in particular, as part of the end effector and therewith part of the kinematic chain. The robotic device also has a controller designed to ascertain a maximum value on the basis of the detected values, if the detected maximum value has a predefined relationship with the first safety limit. Advantages and advantageous embodiments correspond to the advantages and advantageous embodiments of the method. Conversely, advantages and advantageous embodiments of the device also apply to the method.

It is therefore provided in an exemplary embodiment that the robotic device is configured to prevent a movement into an area taken up by a person and/or avoiding or yielding to a person that moves in an area taken up by the robot, so the robotic device is particularly suitable for human-robot cooperation. The robotic device may include cameras and/or pressure sensors on an outer face of the robotic device, as are known from the prior art for the purpose of human-robot cooperation. The robotic device, or a moveable component of the robotic device, may therefore be safely guided, and therefore controlled, by an operator. This has the advantage that the robotic device may be adjusted particularly flexibly to the changing requirements of the human-robot cooperation and be easily used in different scenarios. A safety reserve that may be automatically adjusted or easily adjusted is particularly advantageous, especially for use in different scenarios.

BRIEF DESCRIPTION OF THE DRAWINGS

All of the features and combinations of features cited above in the description, and the features and combinations of features cited below in the description of the figures, and/or illustrated solely in the figures may be used not only in the combination disclosed in each case, but also in other combinations or even alone without departing from the scope of the invention. Embodiments of the invention, which are not explicitly depicted and described in the figures, but emerge by way of separate combinations of features from the described embodiments and may be produced, may therefore be regarded as included and disclosed.

FIG. 3 depicts a schematic flowchart of a third exemplary embodiment of the method for operating a robotic device.

Identical elements or elements with the same function are provided with identical reference numerals in the figures.

DETAILED DESCRIPTION

Figure 1:
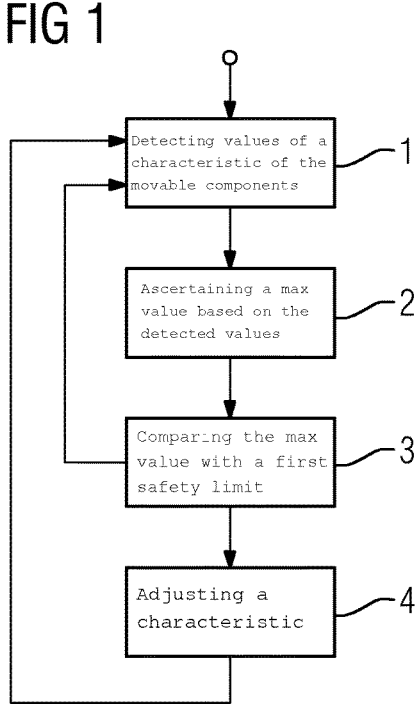
FIG. 1 depicts a schematic flowchart of a first exemplary embodiment of a method for operating a robotic device.

FIG. 1 depicts a schematic flowchart of a first exemplary embodiment of the method for operating a robotic device. The robotic device is designed here, for example, as a robotic device for human-robot cooperation. It has a kinematic chain of movable components. In the present case, a function-specific end member, (e.g., in the form of a tool), for performing an envisaged function, (such as for example holding, welding or other hand movements), is arranged at one end of the kinematic chain. In the present case, the kinematic chain may be guided and moved by an operator in what is known as a gravity-compensation mode. As a consequence of this operation or guiding, the robotic device in this example moves one or more of the movable components at a respective speed.

In the described example, a respective speed of the movable components is detected as a characteristic by detection 1 as an act by sensors arranged on the kinematic chain. Ascertaining 2 forms an additional act in which, in this example, the maximum speed value of the respective speed values of the movable components is ascertained and predefined as the maximum value. A geometry of the movable components in the kinematic chain may also be taken into account, however, during ascertaining 2, so for example a speed of a rotation of a longer component movable perpendicular to an axis of rotation has more influence on the ascertained maximum value than a speed of a shorter movable component moved perpendicularly to an axis of rotation at the same speed. In the present example, the ascertained maximum value represents the highest speed of a movable component, or part of a movable component, relative to an unmoved base of the robotic device.

Comparing 3 the ascertained maximum value with a predefined first safety limit S (FIG. 3) occurs by way of a controller of the robotic device. If, for example, the robotic device is then guided too quickly by an operator, or guided in such a way that a component of the kinematic chain moves so quickly that the ascertained maximum value exceeds the predefined first safety limit, adjusting 4 of the detected characteristic, here the speed, occurs. This may occur for example by braking at least one joint in the kinematic chain or by increasing a rigidity of the kinematic chain. This thereby prevents, for example, a person in the vicinity of the robotic device being endangered by a movable component of the robotic device moving at a speed that exceeds the first safety limit.

If the ascertained maximum value is below the predefined safety limit, the robotic device performs the corresponding movement as envisaged by the operator and the operator will not notice the process. In the illustrated example, the method is repeated, or run through more or less continuously, so after a comparison of the ascertained maximum value, the respective values of at least one characteristic, in this case the speed, is detected again in each case. The risk to persons in the vicinity of the robotic device is reduced therefore.

Figure 2:
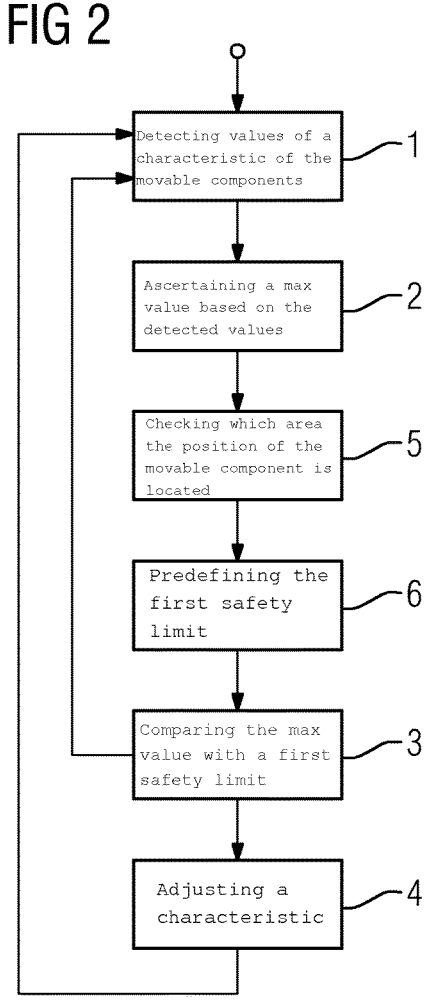
FIG. 2 depicts a schematic flowchart of a second exemplary embodiment of the method for operating a robotic device.

FIG. 2 depicts a schematic flowchart of a second exemplary embodiment of the method for operating a robotic device. The robotic device again has a kinematic chain of movable components here and is designed in the present case as a medical-robotic device for operation in human-robot cooperation as described herein. It may therefore be used in its vicinity, for example, in an operating theatre in confined conditions with a large number of people and devices, in particular also a patient.

In the method, detection 1 of the respective values of at least one characteristic of a plurality of the movable components is performed as an act by sensors arranged on the kinematic chain. In this example, this again relates to a speed as the characteristic. Detection 1 of the characteristic of the movable components occurs here independently of whether one of the movable components in the kinematic chain is in motion or not. In the present case, the positions in which the movable components are located are also detected. In an additional act, ascertaining 2 the maximum value of the speed occurs on the basis of the detected speed values. In the illustrated embodiment, checking 5 as to in which of a plurality of predetermined areas the positions of the movable components are located also occurs. It may also be just one area that is predefined and checked as to whether a moveable component is located in this area or not. In the present case, checking 5 relates to checking in which area a predefined point, for example, a point of a tool of an end member of the robotic device, (e.g., an end point of a needle), is located. The predetermined area may include, for example, an anatomical structure such as an organ of a patient.

In a subsequent act of predefining 6 the first safety limit a respective potential risk may be taken into account that a movement of the function-specific end member, (e.g., the needle), entails in the patient by taking into account a result of checking 5 when predefining 6 the first safety limit. In this example, a movement in a first predetermined area, which includes a specific organ, is therefore extremely dangerous. In the present case, the safety limit for a speed of a movement of the robotic device or of the end member of the kinematic chain is accordingly very low in the first area. A movement of the end member or of the needle described in this example may also be prevented completely in the first area in which the speed permitted there is zero.

An operator may receive feedback that the operator is approaching the first area by a second predetermined area, which surrounds the first area here, by way of a first safety limit, which is higher than the first safety limit in the first area, but at the same time lower than the first safety limit in an area otherwise different from the first two areas. In this way, movement paths of the robotic device may be predefined by predefining 6, in which paths the robotic device, or a function-specific end member, may be moved without adjusting 4 the characteristic. For example, guiding a function-specific end member, or a tool attached thereto, about an anatomical structure of the patient may be facilitated in this way.

If the described method is employed therefore, the above-described acts are run through and the ascertained maximum value thereby changed during subsequent comparing 3 by taking into account the position or positions of the robotic device during adjusting 4 if the detected maximum speed exceeds the respective position-specific first safety limit. The method may also be repeated here or run through more or less continuously. A permanent safety check is carried out thereby and the safety of the patient increased in the present case.

The predetermined areas may, however, also include areas outside of a patient, for example areas in which other, potentially sensitive and expensive medical devices are located. Accordingly, by predefining the areas, a moveable component in the kinematic chain may be prevented from being accidentally moved, or being moved at excessive speed, into one of these areas and potentially damaging devices or persons residing there.

FIG. 3 depicts a schematic flowchart of a third exemplary embodiment of the method for operating a robotic device. This is again a robotic device designed for human-robot cooperation. In the present case the characteristic, whose respective values are detected, is a force F exerted on the robotic device or at least one of the movable components in the kinematic chain of the robotic device. In the illustrated embodiment, predefining 6 the first safety limit S occurs as a function of detected values or of the ascertained maximum value of the force F. Adjusting 4 is based on a rigidity in the present case.

In one act of the method, the first safety limit S is predefined 6. An exertion of force 7 on the robotic device follows in an additional act, and this may be attributed to an operator control action and to gravity and/or other influences. Detection 1 of the respective values of a plurality of the movable components follows for the force F as the characteristic by sensors arranged on the kinematic chain. Ascertaining 2 follows and supplies a maximum value for the force F on the basis of the detected force values. As already described, by comparing 3 the ascertained maximum value with the predefined first safety limit S, a decision is also made here as to whether adjusting 4 a characteristic, here adjusting 4 the rigidity and in the present case therefore blocking of the movement, may occur or not.

If the maximum value of the force F is below the first safety limit S in the illustrated example, detection 1 is continued with directly and the characteristic, here the rigidity of the kinematic chain, is not adjusted. If the maximum value of the force F is above the safety limit S, however, as in the other two exemplary embodiments as well, adjusting 4 of the rigidity of the kinematic chain is carried out, (e.g., by braking or blocking joints in the kinematic chain). In addition, it may be checked here, for example, whether the maximum value of the force exceeds a certain value, for example, a first comparative value y. If this is the case, in the illustrated example, the first safety limit S is changed according to a predetermined rule.

In this way, two different first safety limits, for example, and therewith what is known as a breakaway torque, may be implemented. Movement of a robotic device is only possible after applying a minimum force, (e.g., 3 N), but after applying this minimum force, is also possible with a lower force lying below the threshold, defined by the minimum force, of 3 N in the present case. In the case, for example, of a robotic device operated in a gravity-compensation mode, a lowering of the kinematic chain due to gravity and accompanying endangerment, for example, of a patient, may therefore be prevented.

To achieve a breakaway torque of this kind, in the method, the first safety limit S is predefined in predefining 6 by a first value a of, for example, −1 N. If, for example, a negligible force is then measured in a detection 1 by the sensors arranged on the kinematic chain, the corresponding maximum value of the force F already exceeds the first safety limit S. The force F may be, for example, a gravitational force or an operator control action executed as a very weak pressure on the robotic device. Ascertaining 2 the maximum value produces a value, (e.g., of 2 N), which is above the first safety limit S with the first value a of −1 N in the present case. Adjusting 4 the rigidity accordingly occurs here in such a way that the application of force is compensated and the robotic device does not move.

If the acting force F, and therewith the ascertained maximum value, then increases, the robotic device continues to not move either since the elevated acting force continues to be compensated by adjusting 4 since the maximum value is above the first safety limit S with the value a of, as before, −1 N here. If, however, the maximum value of the force F exerted on the robotic device overshoots the predetermined comparative value y, (e.g., 3 N), the first safety limit S is changed. Specifying 6 of the first safety limit S is then carried out again here therefore, albeit this time with a higher second value b, (e.g., 10 N).

The maximum value of the exerted force F of, for example, 3 N now no longer overshoots the first safety limit S, so adjusting 4 no longer occurs after detection 1, ascertaining 2, and ascertaining 3. The robotic device may move freely accordingly. Even lowering the force F of the movement to a value below the first comparative value y, which is indeed provided as a threshold for the breakaway torque, in the present case 3 N, does not result in blocking here since a maximum value of, for example, 2 N does not exceed the first safety limit S, which is currently the second value, (e.g., 10 N). Accordingly, after the application of the minimum force required for the breakaway torque, the robotic device may also be moved with a very low force as an operator control action.

Changeable predefining 6 of the first safety limit S may be expanded here such that with a safety limit S set at the second value b, a check is also made as to whether a maximum value of the force F of the movement falls below a second comparative value z. This second comparative value z may be set, for example, to 1 N. This means that, for example, if the maximum value of the force F of the movement sinks below this second comparative value z, the first safety limit S is set to the previous first value a, for example −1 N, again. Accordingly, when the maximum value of the force F of the movement falls below the second comparative value z, here 1 N, adjusting 4 the force of the movement again leads to the robotic device no longer moving. The breakaway torque is therefore applied again in order to set the robotic device in motion again.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for operating a robotic device having a kinematic chain of movable components, the method comprising:
   detecting respective values of at least one characteristic of a plurality of the movable components by sensors of the robotic device arranged on the kinematic chain or in a vicinity of the kinematic chain;
   ascertaining a maximum value based on the detected values;
   checking in which of a plurality of predetermined areas a position of a movable component of the kinematic chain is located, a predetermined area of the plurality of predetermined areas being defined by an anatomical structure of a patient;
   predefining a first safety limit as a function of the position, an orientation, or the position and the orientation of the movable component of the kinematic chain, the predefining of the first safety limit taking into account a result of the checking;
   comparing the ascertained maximum value with the predefined first safety limit by way of a controller of the robotic device; and
   adjusting the at least one characteristic or a further characteristic of the kinematic chain when the ascertained maximum value has a predefined relationship with the first safety limit.

2. The method as claimed in claim 1, wherein the at least one characteristic comprises one or more of: (1) a parameter of the kinematic chain as a spring-damper system, (2) a torque acting on the movable components, (3) a force acting on the movable components, (4) a speed of the movable components, or (5) an acceleration of the movable components.

3. The method as claimed in claim 2, wherein the parameter of the kinematic chain is a rigidity, a damping, or the rigidity and the damping of the movable components.

4. The method as claimed in claim 1, wherein, when ascertaining the maximum value, a geometry of the movable components in the kinematic chain is taken into account.

5. The method as claimed in claim 4, wherein the geometry of the movable components is a geometry of a function-specific end member of the kinematic chain.

6. The method as claimed in claim 1, wherein the adjusting occurs when the ascertained maximum value is greater than the first safety limit.

7. The method as claimed in claim 1, wherein the movable component is the function-specific end member of the kinematic chain.

8. The method as claimed in claim 1, further comprising:
predefining the first safety limit as a function of a joint angle of one joint or a combination of joint angles of a plurality of joints between movable components in the kinematic chain.

9. The method as claimed in claim 1, further comprising:
predefining the first safety limit as a function of the function-specific end member of the kinematic chain.

10. The method as claimed in claim 1, further comprising:
predefining the first safety limit as a function of (1) a predefined force, a moment action on the robotic device, or the predefined force and the moment action on the robotic device, and/or (2) the predefined force, a moment impact by the robotic device, or the predefined force, and the moment impact by the robotic device.

11. The method as claimed in claim 10, wherein the predefined force, the moment action, or the predefined force and the moment action are caused by an operator control action on the robotic device, and/or
wherein the predefined force, the moment impact by the robotic device, or the predefined force and the moment impact by the robotic device comprise a consequence of an operator control action.

12. The method as claimed in claim 11, wherein the operator control action on the robotic device is a guiding of the kinematic chain by a hand of an operator.

13. The method as claimed in claim 10, wherein the robotic device is a medical-robotic device used in a medical-operative or medical-diagnostic procedure, and
wherein (1) the predefined force, the moment action, or the predefined force and the moment action occur on the robotic device by way of a movement of a subarea of an organ or an anatomical structure of the patient, and/or (2) the predefined force, the moment impact, or the predefined force and the moment impact occur by way of the robotic device on the organ or the anatomical structure of the patient, and
wherein the respective force, the moment effect, or the respective force and the moment effect are based on a predefined change in force, moment, or force and moment which is standardized to a predefined amount of a distance covered by a function-specific end member, a movable component of the kinematic chain, or both the function-specific end member and the movable component of the kinematic chain.

14. The method as claimed in claim 1, further comprising:
predefining a second safety limit, the second safety limit being higher than the first safety limit;
comparing the ascertained maximum value with the second safety limit; and
outputting a warning signal to an operator when the ascertained maximum value is greater than the second safety limit.

15. The method as claimed in claim 1, further comprising:
predefining a first value and a second value for the first safety limit; and
choosing the first value or the second value as the first safety limit for comparing with the maximum value.

16. The method as claimed in claim 1, further comprising:
predefining the first safety limit as a function of detected values of the at least one characteristic.

17. The method as claimed in claim 1, wherein, even when the maximum value is below the first safety limit, the characteristic is adjusted when, for a predefined time interval, the detected values of the characteristic assume predetermined values representing an idle state of the movable components.

18. The method as claimed in claim 1, wherein the adjusting comprises limiting a movement about at least one joint or a combined movement about a plurality of joints in the kinematic chain.

19. The method as claimed in claim 18, wherein the limiting comprises blocking the joint in the kinematic chain.

20. The method as claimed in claim 1, wherein, when ascertaining the maximum value, the detected values are related to respective individual limits predefined in terms of software, hardware, or the software and the hardware.

21. The method as claimed in claim 1, wherein the robotic device is a medical-robotic device used in a medical-operative or medical-diagnostic procedure.

22. The method as claimed in claim 21, wherein the robotic device is a medical-operative device.

23. A robotic device comprising:
a kinematic chain of movable components;
a plurality of sensors arranged on the kinematic chain or in the vicinity of the kinematic chain, wherein the plurality of sensors are configured to detect respective values of at least one characteristic of a plurality of movable components; and
a controller configured to (1) ascertain a maximum value based on the detected values, (2) check in which of a plurality of predetermined areas a position of a movable component of the kinematic chain is located, a predetermined area of the plurality of predetermined areas being defined by an anatomical structure of a patient (3) predefine a first safety limit as a function of the position, an orientation, or the position and the orientation of the movable component of the kinematic chain, the predefinition of the first safety limit taking into account a result of the check, (4) compare the ascertained maximum value with the predefined first safety limit, and (5) adjust the at least one characteristic or a further characteristic of the kinematic chain when the detected maximum value has a predefined relationship with the first safety limit.

* * * * *